United States Patent [11] 3,596,510

| | | | | |
|---|---|---|---|---|
| [72] | Inventors | Thomas O. Paine<br>Administrator of the National Aeronautics and Space Administration with respect to an invention of:<br>Bernard Siegel, Torrance, Calif.; Seymour Lieberman, Los Angeles, Calif. | 3,357,245 12/1969 Wolfrum ............... 73/290 (B)<br>3,411,351 11/1968 Schwartz............... 73/290 (B) | |
| [21] | Appl. No. | 8,497 | *Primary Examiner*—S. Clement Swisher | |
| [22] | Filed | Feb. 4, 1970 | *Attorneys*—Marvin F. Matthews, John R. Manning and Russell E. Schlorff | |
| [45] | Patented | Aug. 3, 1971 | | |

[54] RESONANT INFRASONIC GAUGING APPARATUS
6 Claims, 3 Drawing Figs.

[52] U.S. Cl............................................. 73/149, 73/290 B
[51] Int. Cl............................................. G01f 23/28
[50] Field of Search................................ 73/149, 290 B, 290 V

[56] References Cited
UNITED STATES PATENTS
3,312,107  4/1967  Burns et al.................  73/290 (B)

ABSTRACT: An apparatus for determining the quantity of liquid in a closed reservoir containing a liquid and an ullage gas. An enclosed gas filled cavity communicates with the reservoir through a common elastomeric diaphragm surface. Infrasonic pressure signals directed into the cavity from a variable frequency driving means cause the ullage gas and the diaphragm to resonate at a frequency proportional to the volume of ullage gas in the reservoir. The ullage volume and therefore the remaining liquid volume is proportional to the ullage gas pressure and the resonant frequency.

Bernard Siegel
Seymour Lieberman
INVENTORS

Bernard Siegel
Seymour Lieberman
INVENTORS

RESONANT INFRASONIC GAUGING APPARATUS

ORIGIN OF THE INVENTION

The invention described herein was made in the performance of work under a NASA Contract and is subject to the provisions of Section 305 of the National Aeronautics and Space Act of 1958, Public Law 85–568 (72Stat. 435; 42 U.S.C. 2457).

BACKGROUND OF THE INVENTION

1. Field of the Invention

This invention relates to a gauging apparatus for determining the quantity of liquid in a closed bladderless reservoir which may be utilized under zero gravity conditions.

2. Description of the Prior Art

Under zero gravity and zero acceleration conditions, the quantity of liquid in a bladderless, enclosed reservoir, such as a fuel tank, cannot be accurately sensed using standard, height measuring, gauge devices because of the absence of gravity and the random dispersal of the ullage gas in the tank throughout the remaining liquid.

One prior art method of determining liquid quantity under these conditions involves measuring the quantity of gas used to pressurize the reservoir from an external source. Remaining liquid quantity may then be calculated as a function of the pressure in the reservoir. This system has a low degree of accuracy and sensitivity, however, and will give an erroneous indication of liquid quantity if there is venting or pressurant leakage from the reservoir.

Other prior art devices gauge reservoir liquid volume by injecting an infrasonic signal—an oscillating pressure signal below the audio frequency range—into the ullage gas in the reservoir. In one such apparatus, the infrasonic signal is simultaneously injected into the ullage gas and into a reference container of known volume. Knowing the ratio of specific heats of the ullage gas and of the reference container gas, and knowing the pressure changes induced into these gases by the infrasonic signal, the volume of reservoir ullage gas can be determined. This type of gauging involves measuring slight changes in several variables and is therefore subject to a large cumulative error. In addition, small random vibrations in the reservoir system will add noise to the measurements, compensation for which will reduce measurement sensitivity.

Another prior art infrasonic apparatus involves injecting a variable frequency infrasonic signal into a driver cavity which is connected to the ullage gas area of the reservoir through an acoustic resistance. Resonance is indicated as a function of phase shift across the acoustic resistence and, since the ratio of specific heats of the gases in the cavity and reservoir ullage area are the same, the ullage volume may be determined as a function of the resonance frequency and phase shift. This apparatus is not suited for many zero gravity applications since entry of the reservoir liquid into the acoustic resistance coupling area will completely void the system. In addition, the value of the acoustic resistance is temperature sensitive.

SUMMARY OF THE INVENTION

This invention comprises an improved infrasonic gauging apparatus which eliminates the problems associated with acoustic resistance coupling between a driver cavity and a reservoir by mechanically isolating the two regions with diaphragm means. The diaphragm means is weighted with a fixed mass which tunes the diaphragm and ullage gas to a resonant frequency that decreases inversely proportional to the square root of the ullage volume. To prevent a change in diaphragm mass and inaccuracy of measurement caused by reservoir liquid contacting the diaphragm means, a second isolating diaphragm means of large surface area is provided. This additional diaphragm also acts as an acoustical transformer to obtain a better impedance match between the driver cavity and the ullage volume when the liquid is randomly oriented in the reservoir. Means are also provided to sense the phase shift between the displacement frequency of the infrasonic oscillating means and the driver cavity pressure pulses and to use this phase shift to control the frequency of the infrasonic oscillator means to maintain the ullage gas/isolating diaphragm combination in resonance.

BRIEF DESCRIPTION OF THE DRAWINGS

Reference to the drawings will further explain the invention wherein like numerals refer to like parts and in which.

DESCRIPTION OF THE PREFERRED EMBODIMENT

Figure 1:
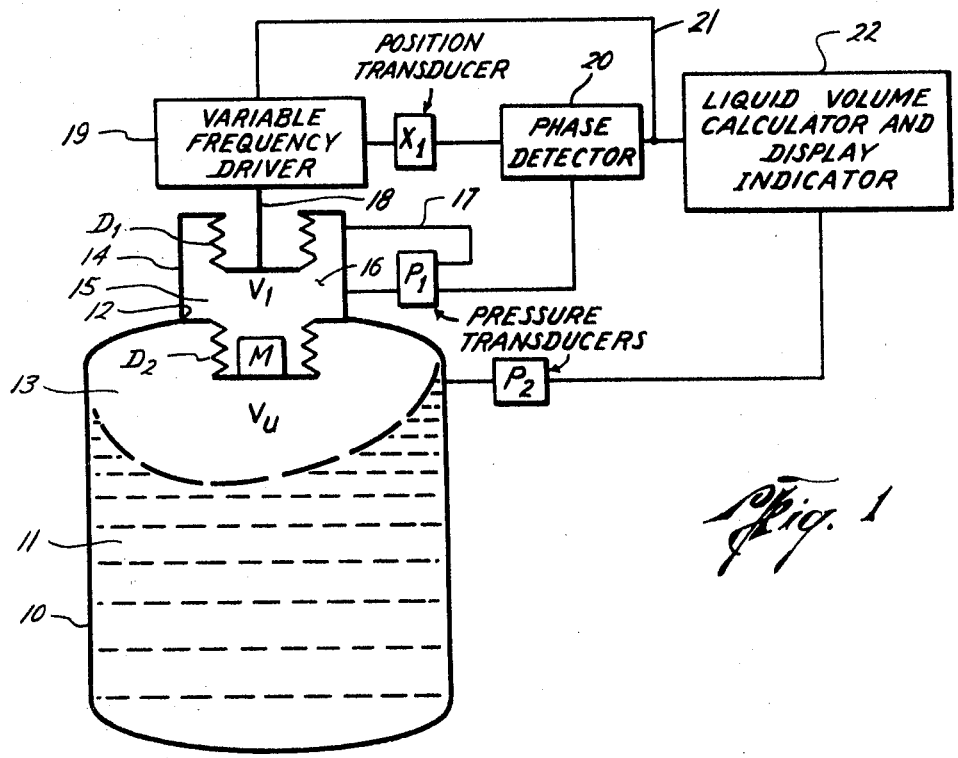
FIG. 1 is a partial schematic illustration of the invention showing the ullage gas of the reservoir adjacent the isolating diaphragm means.

Referring to the drawings, FIG. 1 illustrates in schematic a liquid reservoir or tank 10 having a liquid 11 contained in the lower portion thereof and having an opening 12 at the upper end thereof. An ullage gas 13 of volume $V_u$ is shown above the surface of liquid 11 in reservoir 10 and is contained therein by an isolating means secured about opening 12 in the form of an elastomeric convoluted bellows diaphragm $D_2$ having a mass M secured thereto.

Since this gauging apparatus depends upon oscillation in resonance of the combination of diaphragm $D_2$ and ullage gas 13 of volume $V_u$, as described below, and since the spring rate of diaphragm $D_2$ adds directly to the spring rate of ullage gas 13, diaphragm $D_2$ should be designed with a spring rate less than 10 percent of the spring rate of the smallest $V_u$ volume anticipated so that accurate resonance frequency sensing may be achieved. It is therefore preferred, but not necessary, that diaphragm $D_2$ be constructed of a material such as an elastomer with a low modulus of elasticity. Decreasing the thickness and increasing the surface area of diaphragm $D_2$ will decrease its spring rate. The spring rate of diaphragm $D_2$ may also be lowered through the use of convolutions in the surface area thereof, as illustrated in schematic in FIG. 1. Mass M is added to the normal mass of diaphragm $D_2$ so that diaphragm $D_2$ may resonate at infrasonic frequencies. The required additional mass may be calculated using the formula:

$$M = \frac{A^2 \gamma P_u}{(2f_r)^2 V_u}$$

where:

$M$ is the required mass;
$A$ is the diaphragm surface area;
$\gamma$ is the ullage gas ratio of specific heat;
$P_u$ is the ullage gas pressure;
$f_r$ is the resonant frequency; and
$V_u$ is the ullage gas volume.

A pressure transducer $P_2$ of conventional design communicates with the interior of reservoir 10 and conveniently provides means for sensing the pressure of the ullage gas.

Extending upward from tank 10 surrounding diaphragm $D_2$ is a sleeve 14 which is enclosed at the upper end by a flexible closure member shown in the form of a second bellows diaphragm $D_1$, thereby forming driver cavity 15 of volume $V_1$ with diaphragm $D_2$. Cavity 15 is filled with ullage gas 16 of a predetermined static pressure and specific heat ratio.

A pressure transducer $P_1$ of a generally conventional metallic diaphragm design communicates with cavity 15 and provides means for sensing pressure variations in ullage gas 16. The gas volume enclosed in transducer $P_1$ behind the metallic diaphragm thereof (not shown) is vented to cavity 15 through acoustical filter line 17, thus balancing the static pressure across the metallic diaphragm and allowing pressure transducer $P_1$ to respond only to the varying pressure signals induced in cavity 15 by diaphragm $D_1$ as described below.

Diaphragm $D_1$ is rigidly connected by rod 18 to a variable frequency infrasonic oscillating means in the form of driver 19. Driver 19 may be of any convenient type such as an electronic oscillator or a rotor and cam assembly. Driver 19, together with rod 18 and diaphragm $D_1$, is used to inject infrasonic pressure signals into cavity 15, and through gas 16 and diaphragm $D_2$ into ullage gas 13 in reservoir 10.

If rod 18 and diaphragm $D_1$ are forced downward very slowly, the pressure increase in cavity 15 would be in phase with the downward movement of rod 18. At the same time, ullage gas 13 in reservoir 10 would be compressed in phase. As rod 18 is slowly driven cyclically up and down by oscillating means 19, the above phase relationship will continue to exist.

Volumes $V_1$ and $V_u$ are enclosed gas volumes, however, and are separated by flexible diaphragm $D_2$ having mass M. These volumes and the $D_2$–M combination will therefore have characteristic resonant frequencies, at which frequencies the force from driver 19 and rod 18 required to accelerate mass M will be balanced by the restoring force of the compressed gas volumes. These resonant frequencies may be expressed by the equation:

$$f_r = \frac{1}{2\pi} \sqrt{\frac{A2\gamma P}{MV}}$$

where:

$f_r$ is the resonant frequency;
$A$ is the area of flexible diaphragm $D_2$,
$\gamma$ is the ratio of specific heats;
$P$ is the closed volume pressure;
$M$ is the mass associated with diaphragm $D_2$, and
$V$ is the container volume.

With $V_1$ selected to be one-fifth or less of the size of the smallest $V_u$, then $f_r$ of $V_1$ will be five or more times higher than $f_r$ of $V_u$, and at $f_r$ of $V_u$, $V_1$ will act essentially as a continuation of rod 18, imposing a motion upon mass M.

Thus, the resonant frequency is related to the magnitude of the spring rate of ullage gas 13 of volume $V_u$. By knowing the mass M, the area A of diaphragm $D_2$, the pressure $P_2$, the resonant frequency $f_r$ of $V_u$, and specific heat ratio of ullage gas 13, the ullage volume may be determined.

The resonant frequency of $V_u$ may be simply detected. A position or displacement transducer $X_1$ is operably connected to oscillating means 19 or rod 18 and provides means for sensing the linear displacement of rod 18 and diaphragm $D_1$. Transducer $X_1$ may be selected from a number of convenient devices, such as solid state strain gauges, variable capacitance gauges or cantilevered piezoelectric pickups. However, the solid state strain gauge is preferred because of its simplicity and high signal output. As the frequency of driver 19 is varied, transducer $P_1$ indicates the dynamic pressure induced into volume $V_1$ and transducer $X_1$ indicates the displacement of rod 18. As driver 19 reaches $f_r$ of $V_u$, the restoring effect of compressed ullage gas 13 will cause pressure $P_1$ to minimize as the displacement of rod 18 increases downwardly, thereby creating a 90° phase shift between $P_1$ and $X_1$.

A phase detector 20, which may utilize any one of several conventional measurement techniques, is operably connected to $P_1$ and $X_1$ and provides means for sensing the resonance phase shift of 90°. With a sinusoidally varying displacement of driver 19 and rod 18, a multiplier-filter phase detecting technique is preferred. With the driver amplitude in the form:

$$X_1 = A \sin \omega t,$$

the pressure $P_1$ will be:

$$P_1 = B \sin(\omega t + \Phi) + c(t)$$

where $\Phi$ represents the phase shift between $X_1$ and $P_1$ and $c(t)$ represents noise in the measurement signals $X_1$ and $P_1$. Electronically multiplying $X_1$ and $P_1$ together by conventional circuitry yields:

$$X_1 P_1 = A(\sin \omega t)[B \sin(\omega t + \Phi) + c(t)]$$

which can be simplified to $$X_1 P_1 = A c_t(t)[\sin(\omega t + \Phi)] - (AB/2)[\cos(2\omega t + \Phi)] + (AB/2)\cos\Phi.$$

Since all of these functions except "$AB/2 \cos \Phi$" are time varying sinusoidal functions, these functions can be removed by passing the multiplied signal through a conventional low frequency passband filter, thereby leaving only the DC signal "$(AB/2) \cos \phi$". The value of this D.C. signal will therefore become zero at the resonant frequency $f_r$. In addition, the rate of change of the DC signal is quite rapid as the system approaches resonance, thus making this type of measurement technique quite sensitive to small changes in the region of $f_r$ and allowing very good resolution.

The output from phase detector 20 is supplied through line 21 to driver 19 and is used to control the frequency of driver 19 in a conventional manner, thereby maintaining the system in resonance.

A liquid volume calculator and display indicator 22 of conventional design is operably connected to driver 19 and transducer $P_2$ and when programmed with the ratio of specific heats, liquid mass and liquid density, converts the measured resonant frequency into a direct liquid volume indication.

Figure 2:
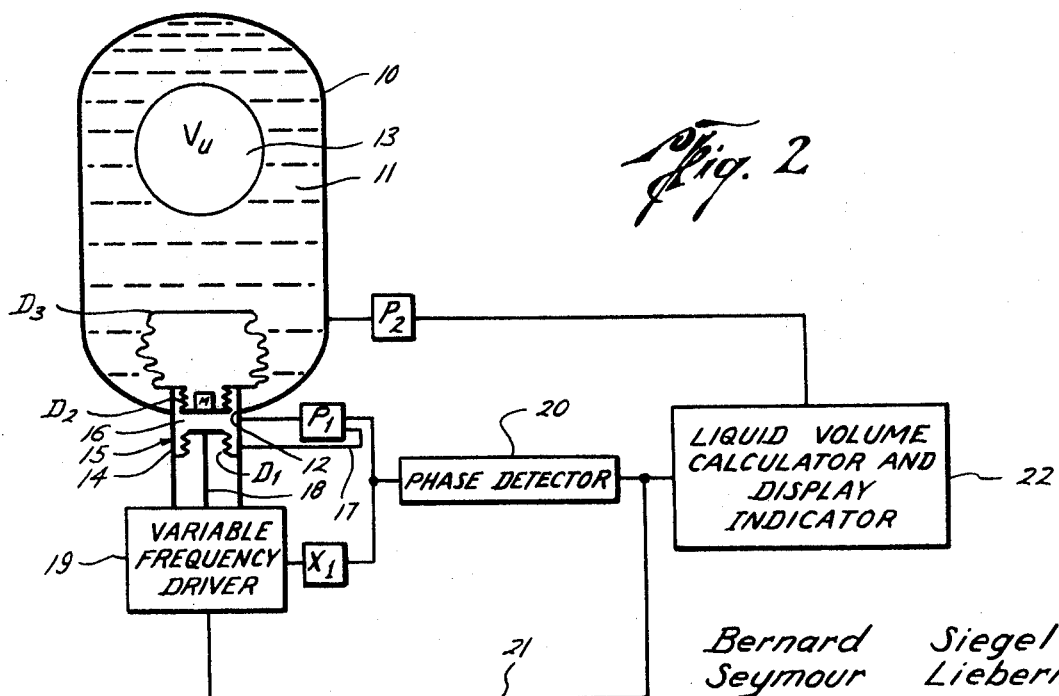
FIG. 2 is a partial schematic illustration of the invention including a second diaphragm means for isolating the driver diaphragm means from randomly dispersed reservoir liquid.

As illustrated in FIG. 2, under zero gravity conditions, the ullage gas 13 may consist of discontinuous gas pockets. However, as explained above, an accurate reservoir liquid volume determination may only be made when the mass M of diaphragm $D_2$ is known. Therefore, a second isolating means for isolating liquid 11 from diaphragm $D_2$ is provided in this embodiment in the form of elastomeric diaphragm $D_3$. The surface area of diaphragm $D_3$ is made roughly equivalent to the cross-sectional area of the reservoir, causing diaphragm $D_3$ to serve additionally as a transformer to convert the long stroke—small area motion of diaphragm $D_2$ into a small stroke—large area motion. The resulting large area motion more closely matches the impedance of the liquid in the reservoir and more effectively communicates the infrasonic pressure signal to submerged ullage gas pockets.

Figure 3:
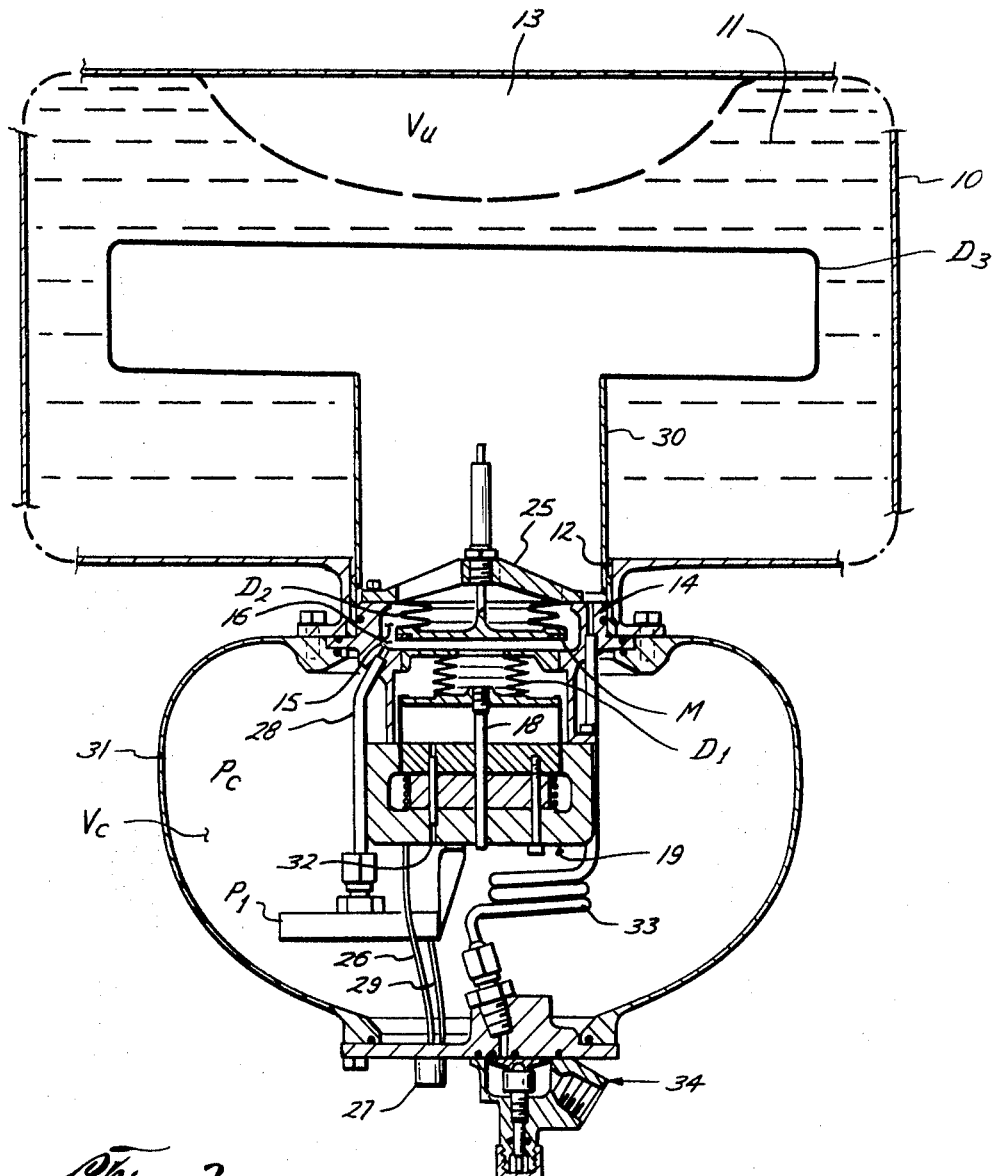
FIG. 3 is a partial vertical sectional view of a preferred embodiment of the invention.

One form of working embodiment of the driver-reservoir portion of the apparatus illustrated in FIG. 2 is shown in partial detail in FIG. 3. In this embodiment, a generally tubular tank 10 having a liquid 11 and ullage gas 13 therein is enclosed at its upper end and has an opening 12 at the lower end thereof. A generally tubular sleeve 14 is rigidly coaxially disposed in opening 12 and extends downwardly therefrom. Sleeve 14 has a spider 25 mounted thereon, and together they support a convoluted elastomeric diaphragm $D_2$ having a mass M affixed thereto in sealing closure of the upper end of sleeve 14. The lower end of sleeve 14 supports oscillating means in the form of an electromagnetic driver 19 having a coaxial slidable rod member 18 therein. Driver 19 is similar in design to a driver for a conventional electromechanical audio loudspeaker and is connected to wires 26 and connector 27 which provide means for communicating electrical energy to driver 19.

The central portion of the interior opening of sleeve 14 is closed by a convoluted elastomeric diaphragm $D_1$, forming a driver cavity 15 with sleeve 14 and diaphragm $D_2$. Rod 18 provides means for transferring force from driver 19 to diaphragm $D_1$. A gas 16 of volume $V_1$ is contained in cavity 15 and the pressure of this gas is sensed by pressure transducer $P_1$, communicating with cavity 15 through tube 28. Wires 29 connecting transducer $P_1$ and connector 27 are provided for communicating the pressure signal from transducer $P_1$.

An elongate conduit 30 is secured to the upper end of sleeve 14 and extends upwardly into liquid 11 in reservoir 10. The upper end of conduit 30 is enclosed by an elastomeric diaphragm $D_3$ having a surface area approximately equal to the cross-sectional area of reservoir 10. Diaphragm $D_3$ and conduit 30 serve to isolate liquid 11 from diaphragm $D_2$ and additionally act as a pressure transformer between liquid 11 and diaphragm $D_2$.

A back can 31 of volume $V_c$ is secured to the lower end of reservoir 10 about sleeve 14 and encloses sleeve 14, driver 19 and transducer $P_1$. Back can 31 is pressurized to a pressure $P_c$ which is approximately the same pressure as that in reservoir 10 and provides means for operating the gauging device in a low pressure or vacuum environment without rupture of the diaphragm. Back can 31 also serves to prevent loss of liquid from reservoir 10 if diaphragm rupture should occur. Port 32 through driver 19 allows pressure equalization between the lower portion of diaphragm $D_1$ and the enclosed back can area external to sleeve 14. A tube 33 and valve 34 provide means for adjusting the initial pressure inside of diaphragm $D_3$.

The presence of back can 31 does not affect the operation of the gauging apparatus as described in connection with FIG. 2 above. The only operational change rendered by back can 31 is to require a greater driving force from driver 19, since driver 19 must effectively act against the combined pressures of the back can gas $P_c$ and the pressure $P_1$ of gas 16.

The foregoing description is to be construed as illustrative only, and further modifications and alternate embodiments of the invention will be apparent to those skilled in the art in view of this description.

What we claim is:

1. In gauging means of the acoustic resonating type adapted for determining the quantity of liquid in a closed reservoir containing a quantity of ullage gas, said gauging means including a driver cavity chamber communicating with said ullage gas in said reservoir, variable frequency infrasonic oscillating means for generating a cyclical pressure change in said chamber, means for sensing the frequency of said oscillating means, and means for indicating the quantity of liquid as a function of said frequency, the improvement comprising:

isolating means for closing said chamber and isolating the gas in said chamber from said ullage gas, said isolating means having a predetermined mass and being arranged for resonant motion with said ullage gas at a predetermined oscillator frequency and given quantity of ullage gas.

2. The invention as claimed in claim 1 including:

pressure sensing means communicating with said closed driver cavity chamber for sensing the pressure changes therein;

means operably connected to said infrasonic oscillating means for sensing the displacement thereof;

and, means for sensing the phase angle between said pressure in said cavity and said displacement of said oscillating means as an indication of the existence of resonance of said ullage gas and said diaphragm means.

3. The invention as claimed in claim 2 wherein:

said isolating means is an elastomeric diaphragm.

4. The invention as claimed in claim 3 including:

means for automatically varying the frequency of said variable frequency infrasonic oscillating means in response to changes in pressure in said cavity to maintain said ullage gas and said first elastomeric diaphragm in a resonant condition.

5. The invention as claimed in claim 4 including:

a second isolating means disposed in said reservoir for isolating said liquid from said elastomeric diaphragm and moving in a resonant relationship to said diaphragm.

6. The invention as claimed in claim 5 wherein:

said second isolating means comprises an elongate conduit communicating at a first end with said elastomeric diaphragm and terminated at the second end by a second elastomeric diaphragm having a surface area larger than the surface area of said first diaphragm.